(12) United States Patent
Zhang (10) Patent No.: US 11,144,742 B2
(45) Date of Patent: Oct. 12, 2021

(54) FINGERPRINT SENSOR AND TERMINAL DEVICE

(71) Applicant: SHENZHEN GOODIX TECHNOLOGY CO., LTD., Shenzhen (CN)

(72) Inventor: Mengwen Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 131 days.

(21) Appl. No.: 16/150,269

(22) Filed: Oct. 3, 2018

(65) Prior Publication Data

US 2019/0138782 A1    May 9, 2019

Related U.S. Application Data

(63) Continuation of application No. PCT/CN2017/109767, filed on Nov. 7, 2017.

(51) Int. Cl.
*G06K 9/00* (2006.01)
*G01D 5/24* (2006.01)
(Continued)

(52) U.S. Cl.
CPC ............. *G06K 9/0002* (2013.01); *G01D 5/24* (2013.01); *G06F 3/044* (2013.01); *G06F 3/04166* (2019.05)

(58) Field of Classification Search
CPC .... H04N 5/378; H04N 5/76–765; G01D 5/24; G01P 15/125; G06K 9/00–982;
(Continued)

(56) References Cited

U.S. PATENT DOCUMENTS

| 4,297,642 A | 10/1981 | Baldwin et al. |
| 2012/0242407 A1* | 9/2012 | Yan .......................... H03F 3/187 330/251 |

(Continued)

FOREIGN PATENT DOCUMENTS

| CN | 101651452 A | 2/2010 |
| CN | 103616977 A | 3/2014 |

(Continued)

*Primary Examiner* — Stephen G Sherman
*Assistant Examiner* — Aaron Midkiff
(74) *Attorney, Agent, or Firm* — Scully Scott Murphy & Presser (57) ABSTRACT

A fingerprint sensor and a terminal device are provided. The fingerprint sensor includes a plurality of integration circuits (110) and a negative feedback circuit (120); the negative feedback circuit (120) is connected to the plurality of integration circuits (110) for respectively fixing an input common mode voltage of each of the integration circuits (110) as a reset bias voltage when the plurality of integration circuits (110) are in a reset phase; and each of the integration circuits (110) corresponds to a fingerprint capacitor respectively, and the integration circuit (110) is configured to perform integration processing on a charge of the corresponding fingerprint capacitor when in an integration phase, and output an output voltage related to the fingerprint capacitor. A fingerprint sensor and a terminal device of the present application could improve an SNR of a fingerprint image without increasing resources of a main control RAM.

11 Claims, 6 Drawing Sheets

(51) Int. Cl.
*G06F 3/044* (2006.01)
*G06F 3/041* (2006.01)

(58) Field of Classification Search
CPC .. G06K 9/0002; G06K 9/00006–00093; H03F 3/005; H03F 2200/264; H03F 2203/451566; H03F 2203/45174; H03F 1/0233; H03F 1/0272; H03F 3/3001; H03F 2203/30027; H03F 2203/30063; H03F 2203/45156; H03F 1/02–0294; H03F 3/00–72; H03F 2200/121; H03F 2200/18; H03F 2200/453; H03F 2200/456; H03F 2200/72; H03F 2203/45–45732; H03F 2203/45288; H03F 2203/45536; H03F 2203/45408; H03F 2203/45528; H03F 3/45–45995; H03F 3/45179; H03F 2203/00–7239; H03F 3/45596–45627; H03F 3/45744–45775; H03F 3/45892–45923; H03F 3/45968–45995; H03F 2200/42; H03F 2200/375; H03F 2203/30021; H03F 2203/30081; H03F 2203/30114; H03F 2203/45034; H03F 2203/45038–45044; H03F 2203/45084; H03F 2203/45152; H03F 2203/451296; H03F 2203/45298; H03F 2203/45212; H03F 2203/45214; H03F 2203/45308; H03F 2203/45332; H03F 2203/45354; H03F 2203/45414; H03F 2203/45476; H03F 2203/45478; H03F 2203/45512; H03F 2203/45546; H03F 2203/45632; H03F 2203/506; H03F 1/00–565; H03F 2200/00–99; G06F 3/00–167; G06F 3/041–04897; G06F 3/044–0448; G06F 3/45–45995; G06F 2203/45–45732
USPC ............... 324/658, 684, 679; 330/296, 75; 178/18.06; 345/173–178
See application file for complete search history.

(56) References Cited

U.S. PATENT DOCUMENTS

| | | | |
|---|---|---|---|
| 2014/0132562 A1* | 5/2014 | Miyamoto | G06F 3/04883 345/174 |
| 2016/0013765 A1* | 1/2016 | Peluso | H03F 1/303 330/260 |
| 2017/0006245 A1 | 1/2017 | Akhavan Fomani et al. | |
| 2017/0068837 A1* | 3/2017 | Pi | G06K 9/00013 |
| 2017/0193262 A1 | 7/2017 | Lo et al. | |
| 2017/0207760 A1* | 7/2017 | Werking | G01P 15/125 |
| 2017/0235993 A1 | 8/2017 | Xu et al. | |

FOREIGN PATENT DOCUMENTS

| | | |
|---|---|---|
| CN | 104217193 A | 12/2014 |
| CN | 105046194 A | 11/2015 |
| CN | 106326813 A | 1/2017 |
| CN | 106462552 A | 2/2017 |
| CN | 107016331 A | 8/2017 |

* cited by examiner

FINGERPRINT SENSOR AND TERMINAL DEVICE

CROSS-REFERENCE TO RELATED APPLICATIONS

This application is a continuation of International Application No. PCT/CN2017/109767, with an international filing date of Nov. 7, 2017, which is hereby incorporated by reference in its entirety.

TECHNICAL FIELD

The present application relates to the field of fingerprint detection, and more particularly, to a fingerprint sensor and a terminal device.

BACKGROUND

In a capacitive fingerprint circuit scheme, it can be divided into two categories according to a driving mode, i.e., a mutual capacitance driving scheme and a self-capacitance driving scheme. The mutual capacitance driving scheme has low dependence on parasitism and offset, and can effectively improve a signal-to-noise ratio (Signal-to-Noise Ratio, SNR) by changing a driving voltage. However, mutual capacitance driving has a disadvantage: costs and power consumption of a mutual capacitance driving scheme are much higher, because an additional driving circuit is required, and a large amount of energy is dissipated on a finger during a driving process.

Self-capacitance driving needs to overcome effects of parasitism and offset in order to obtain a better performance. An existing method is to pre-store an image of a frame without a finger contact in a main control random access memory (random access memory, RAM), then acquire an image of a frame with a finger contact, and finally subtract the images of the two frames to obtain a fingerprint image in which effects of parasitism and offset are eliminated. However, such method has a drawback, because a fingerprint image has as many as 10,000 pixels or even more, and assuming there are 10,000 pixels, and quantized data of each pixel occupies 2 bytes, two pictures need at least 320 kb of RAM, which consumes a considerable amount of main control resources.

SUMMARY

In view of this, an embodiment of the present application provides a fingerprint sensor and a terminal device, which can improve a signal-to-noise ratio of a fingerprint image without increasing a main control RAM.

In a first aspect, a fingerprint sensor is provided. The fingerprint sensor includes a plurality of integration circuits and a negative feedback circuit; the negative feedback circuit is connected to the plurality of integration circuits for respectively fixing an input common mode voltage of each of the integration circuits as a reset bias voltage when the plurality of integration circuits are in a reset phase; and each of the integration circuits corresponds to a fingerprint capacitor respectively, and the integration circuit is configured to perform integration processing on a charge of the corresponding fingerprint capacitor when in an integration phase, and output an output voltage related to the fingerprint capacitor.

An input common mode voltage of a plurality of integration circuits can be fixed as a reset bias voltage by introducing a negative feedback circuit in a reset phase of an integration circuit, which is beneficial to reduce an offset voltage of the integration circuit in a fingerprint sensor, and improve an SNR of a fingerprint image without increasing main control RAM overheads.

Optionally, the fingerprint sensor is a self-capacitive fingerprint sensor.

Optionally, the arrangement manner of the plurality of integration circuits may be an arrangement of M*N, or may be other arrangement manners.

In one possible design, the negative feedback circuit includes an operational amplifier, and the operational amplifier is configured to form a negative feedback loop with the integration circuit when the integration circuit is in the reset phase.

Optionally, the negative feedback circuit may also be a resistor which forms a negative feedback loop with the integration circuit.

Using an operational amplifier as a negative feedback circuit can better stabilize an input common mode voltage of an integration circuit.

In one possible design, the fingerprint sensor further includes a reference circuit, and the reference circuit is connected to the operational amplifier for providing the reset bias voltage to the operational amplifier.

Optionally, the operational amplifier may also be connected to a fixed voltage as a reference voltage.

By introducing a reference circuit to provide a bias voltage for an operational amplifier, it is not necessary to change a circuit structure when a change in an input common mode voltage is desired, but only to adjust an adjustable resistor in the reference circuit, which is simple and flexible.

In one possible design, the negative feedback circuit includes an offset correction unit, and the reset phase of the integration circuit includes a first phase and a second phase, where the offset correction unit is configured to acquire an offset voltage at two input terminals of the operational amplifier when the integration circuit is in the first phase, and the offset voltage is used to perform offset correction on the integration circuit in the second phase, so that the input common mode voltage of the integration circuit is fixed as the reset bias voltage.

By introducing an offset correction unit to reduce effects of an offset voltage at two input terminals of an operational amplifier, a performance of a fingerprint sensor could be better improved.

In one possible design, the offset correction unit includes a zeroing capacitor, and a voltage on the zeroing capacitor in the first phase is an offset voltage.

It is simple and easy to implement acquisition the offset voltage at two terminals of the operational amplifier by using a zeroing capacitor.

In one possible design, one terminal of the zeroing capacitor is connected to a non-inverting input terminal of the operational amplifier, and also connected to an output terminal of the integration circuit when the integration circuit is in the first phase, while disconnected from the output terminal of the integration circuit when the integration circuit is in the second phase; and the other terminal of the zeroing capacitor is connected to an inverting input terminal of the operational amplifier when the integration circuit is in the first phase, while connected to the output terminal of the integration circuit, and disconnected from the inverting input terminal of the operational amplifier when the first integration circuit is in the second phase.

In one possible design, the negative feedback circuit further includes a first switch, a second switch and a third switch; one terminal of the zeroing capacitor is connected to a non-inverting input terminal of the operational amplifier, and connected to an output terminal of the integration circuit through the first switch; and the other terminal of the zeroing capacitor is connected to the output terminal of the integration circuit through the second switch, and connected to an inverting input terminal of the operational amplifier through the third switch, and an output terminal of the operational amplifier is connected to a feedback terminal of the integration circuit.

In one possible implementation manner, when the integration circuit is in the first phase, the first switch and the third switch are turned on, while the second switch is turned off; and when the integration circuit is in the second phase, the first switch and the third switch are turned off, while the second switch is turned on.

In one possible design, the integration circuit includes an amplification circuit, and the amplification circuit includes an input terminal for receiving the input common mode voltage, a feedback terminal connected to the negative feedback circuit, and an output terminal for providing the output voltage.

In one possible design, the amplification circuit includes a first metal oxide semiconductor MOS transistor and a second MOS transistor, where the second MOS transistor is connected to the negative feedback circuit for providing a constant current to the first MOS transistor when the integration circuit is in an integration phase.

In one possible design, a gate of the first MOS transistor is connected to the input terminal of the amplification circuit, a source of the first MOS transistor is grounded, and a drain of the first MOS transistor is connected to the output terminal of the amplification circuit; and a gate of the second MOS transistor is connected to the feedback terminal of the amplification circuit through a feedback switch, a drain of the second MOS transistor is connected to the drain of the first MOS transistor, and a source of the second MOS transistor is connected to a power supply terminal, and a gate capacitor is provided between the gate and the source of the second MOS transistor.

In one possible design, the feedback switch is turned off when the integration circuit is in the integration phase, and is turned on when the integration circuit is in the reset phase.

In one possible implementation manner, the integration circuit further includes a reset switch and an integration capacitor, and the reset switch and the integration capacitor are connected in parallel with each other and connected between the gate and the drain of the first MOS transistor.

In one possible implementation manner, the plurality of integration circuits include a plurality of rows of integration circuits, and the negative feedback circuit corresponds to one row of integration circuits.

In a second aspect, a terminal device is provided. The terminal device includes the fingerprint sensor according to the first aspect or any of optional implementation manners of the first aspect.

Based on the above technical solutions, an offset voltage of a plurality of integration circuits may be reduced or even cancelled by introducing a negative feedback circuit in an integration reset phase, and further, an SNR of a fingerprint image could be improved without occupying main control RAM resources. That is, it is not necessary to overcome an offset of a fingerprint sensor by acquiring images of two frames and performing subtraction between the images of the two frames. Moreover, since the negative feedback circuit only operates in a reset phase of an integration circuit, power consumption is substantially not increased.

These and other aspects of the present application will be more readily apparent in the following description of the embodiments.

DESCRIPTION OF EMBODIMENTS

A clear and complete description of technical solutions of embodiments of the present application will be given below, with reference to the accompanying drawings in the embodiments of the present application.

A fingerprint sensor is a key device for automatic fingerprint acquisition. The earliest fingerprint identification technology relates to an optical identification system based on an optical fingerprint sensor, and the identification range is only limited to a skin surface layer, which is called the first generation fingerprint identification technology. And the later developed second generation fingerprint identification system adopts a capacitive fingerprint sensor technology, and realizes conversion of the identification range from epidermis to dermis, thereby greatly improving an accuracy rate of identification and safety of a system.

A capacitive fingerprint sensor determines where a fingerprint ridge is located and where a fingerprint valley is located according to values of capacitance formed between the fingerprint ridge and a sensing electrode, and between the fingerprint valley and the sensing electrode. The operating process is pre-charging a capacitive sensing electrode on each pixel point to a certain reference voltage. When a finger touches a surface of a semiconductor capacitive fingerprint sensor, a capacitor array is formed between a finger fingerprint and a pixel array, and a capacitance value of each fingerprint capacitor in the capacitor array becomes smaller as a distance between conductors increases, because a fingerprint ridge is convex, while a fingerprint valley is concave. According to the relationship between the capacitance value and the distance, different capacitance values are generated for the fingerprint ridge and fingerprint valley, respectively. Then, discharge is performed using a discharge current, and a fingerprint image is obtained by reading a capacitance difference between charge and discharge.

To put it simply, a capacitive fingerprint sensor includes a plurality of pixel circuits, each of the pixel circuits has a pixel electrode (i.e., a sensing electrode plate) to generate a fingerprint capacitor with a fingerprint on a surface of a finger, and all pixel electrodes form a pixel array (such as 128*96 or 96*96). Since a distance between a fingerprint ridge and the pixel electrode is different from that between a fingerprint valley and the pixel electrode, capacitances of a fingerprint capacitor formed therebetween are different. Whether the pixel electrode is located at a fingerprint ridge or a fingerprint valley can be identified by detecting a capacitance value, and a fingerprint image can be obtained according to a detection result of each of the pixel circuits.

A capacitive fingerprint sensor can be further categorized into a self-capacitive fingerprint sensor and a mutual capacitive fingerprint sensor according to the detection principle.

Generally speaking, a self-capacitive fingerprint sensor has a major parasitism and offset problem. Current self-capacitive fingerprint sensor overcomes the effects of the offset by sacrificing resources of a main control RAM, however, increasing the main control RAM resources could also introduce some other effects, and performance is not obviously improved. In view of this, a new self-capacitive fingerprint sensor is needed to overcome the above-mentioned circuit offset problem.

Figure 1:
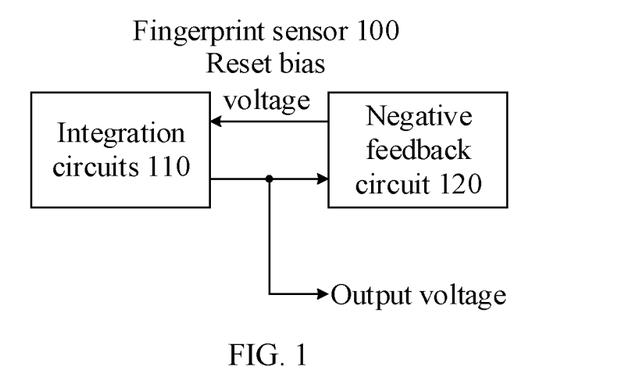
FIG. 1 shows a schematic block diagram of a fingerprint sensor according to an embodiment of the present application.

FIG. 1 shows a schematic block diagram of a fingerprint sensor 100 that is provided according to an embodiment of the present application. As shown in FIG. 1, the fingerprint sensor 100 includes a plurality of integration circuits 110 and a negative feedback circuit 120; the negative feedback circuit is connected to the plurality of integration circuits for respectively fixing an input common mode voltage of each of the integration circuits as a reset bias voltage when the plurality of integration circuits are in a reset phase; and each of the integration circuits corresponds to a fingerprint capacitor respectively, and the integration circuit is configured to perform integration processing on a charge of the corresponding fingerprint capacitor when in an integration phase, and output an output voltage related to the fingerprint capacitor.

It should be understood that the fingerprint sensor 100 generally includes an integration circuit array. As a preferred embodiment, the integration circuit array may be a square array, such as M rows and N columns; alternatively, the integration circuit array may also be arranged in other arrangement manners, and an embodiment of the present application does not limit the arrangement manner of the integration circuit array.

It should also be understood that data of an integration circuit array is typically read in units of rows, that is, image data output by one row of the integration circuits in the integration circuit array is read each time.

Optionally, in an embodiment, a negative feedback circuit may be separately configured for each of integration circuits, and then each row of the integration circuits may simultaneously form a negative feedback loop with the respective negative feedback circuit in a reset phase. Preferably, in this embodiment, a negative feedback circuit may also be configured for each row of integration circuits, that is, the fingerprint sensor 100 is configured with M negative feedback circuits, which are respectively connected to M rows of integration circuits correspondingly; when output data of a certain row of integration circuits is to be read, the row of integration circuits may be enabled to be in a reset phase respectively, so as to constitute a negative feedback loop with the negative feedback circuit corresponding to the row of integration circuits successively. In other alternative embodiments, a negative feedback circuit may also be configured for an entire integration circuit array, and the negative feedback circuit may form a negative feedback loop with each of integration circuits successively when each of the integration circuits is in a reset phase.

In an actual circuit design, the number of negative feedback circuits of the fingerprint sensor 100 may be specifically implemented with reference to requirements of the fingerprint sensor for cost and acquisition speed. If the fingerprint sensor has a higher time requirement but a low cost requirement, more negative feedback circuits may be configured for an integration circuit array; however, if the fingerprint sensor has a higher cost requirement but a low acquisition speed requirement, fewer negative feedback circuits may be configured for an integration circuit array. This is not limited in the embodiment of the present application.

Figure 2:
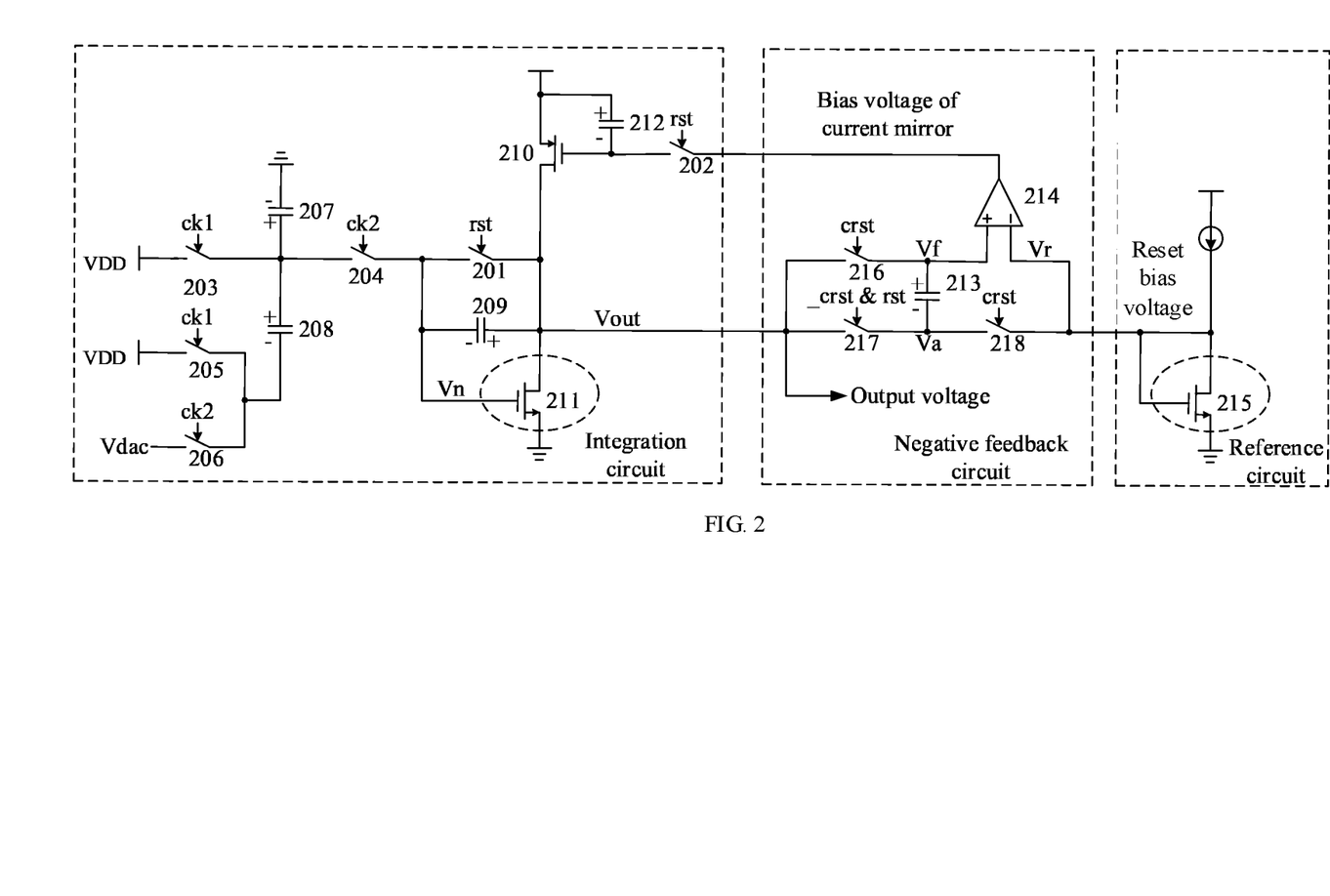
FIG. 2 shows a schematic circuit diagram of a fingerprint sensor according to an embodiment of the present application.

For convenience of description, a circuit structure of a fingerprint sensor according to an embodiment of the present application is firstly introduced. FIG. 2 shows a schematic block diagram of a circuit connection structure of any integration circuit and a negative feedback circuit in a fingerprint sensor 200 according to an embodiment of the present application. As shown in FIG. 2, a feedback terminal of the integration circuit is connected to the negative feedback circuit, and the negative feedback circuit may include an operational amplifier 214, a zeroing capacitor 213, a first switch 216, a second switch 217, and a third switch 218. An output terminal of the integration circuit is connected to a negative electrode plate of the zeroing capacitor 213 through the second switch 217, and the output terminal of the integration circuit is further connected to a positive electrode plate of the zeroing capacitor 213 and a non-inverting input terminal of the operational amplifier 214 through the first switch 216; and the negative electrode plate of the zeroing capacitor 213 is connected to an inverting input terminal of the operational amplifier 214 through the third switch 218. On the other hand, the inverting input terminal of the operational amplifier 214 is further connected to a reference circuit for receiving a reset bias voltage provided by the reference circuit. The zeroing capacitor 213 may be used as an offset correction unit for acquiring an offset voltage of the operational amplifier 214, and the offset voltage is used for offset correction of the integration circuit. In the embodiment shown in FIG. 2, the reference circuit may include a metal oxide semiconductor (metal oxide semiconductor, MOS) transistor 215, and the MOS transistor 215 may be specifically an N-type MOS transistor in which a source is grounded, a gate is connected to a drain, and further, the drain of the MOS transistor 215 is connected to a constant current source and connected to the negative feedback circuit for providing the reset bias voltage to the negative feedback circuit.

It is understood by those skilled in the art that a capacitor is actually composed of two metal layers, and positive and negative electrode plates are not necessarily distinguished. Therefore, the connection relationship of the zeroing capacitor 213 described in FIG. 2 is merely for schematic description, and is not limited thereto.

The integration circuit includes an amplification circuit, an integration capacitor 209, and a reset switch 201. The amplification circuit includes a first MOS transistor 211 and a second MOS transistor 210. The first MOS transistor 211 and the second MOS transistor 210 may be an N-type MOS transistor and a P-type MOS transistor, respectively. In a specific embodiment, the amplification circuit may include an input terminal, a feedback terminal, and an output terminal, and the integration capacitor 209 and the reset switch 201 are connected in parallel with each other and connected between the input terminal and the output terminal of the amplification circuit. A gate of the first MOS transistor 211 is connected to the input terminal of the amplification circuit for receiving an input voltage Vn, a source of the first MOS transistor 211 is grounded, and a drain of the first MOS transistor 211 may be connected to the output terminal of the amplification circuit for providing an output voltage Vout. A gate of the second MOS transistor 210 is connected to the feedback terminal of the amplification circuit through a feedback switch 202, and a drain of the second MOS transistor 210 is connected to the drain of the first MOS transistor 211 (i.e., connected to the output terminal of the amplification circuit), a source of the second MOS transistor 210 is connected to a power supply terminal, and a gate capacitor 212 is provided between the gate and the source of the second MOS transistor 210.

Referring to FIG. 2, the integration circuit further includes a fingerprint capacitor 207, a substrate cancelling capacitor 208, and switches 203-207.

The fingerprint capacitor 207 is specifically a capacitor formed between a finger surface and a sensing electrode plate when a user presses the fingerprint sensor 100 by a finger. It should be noted that pressing the fingerprint sensor 100 by the finger mentioned in the present application may specifically refer that a finger presses a cover above the fingerprint sensor 100, for example, a protective cover (i.e., a main glass cover) on a front face of a terminal device, or a ceramic cover, a glass cover, a sapphire cover, or a coating layer of a fingerprint module. As an alternative embodiment, the fingerprint sensor 100 may also be disposed under a display screen (such as an OLED display screen), and in this case, the cover may specifically refer to the display screen.

In a specific embodiment, the fingerprint sensor 100 may have a sensing array including a plurality of sensing electrode plates (i.e., pixel electrodes), each of which corresponds to an integration circuit, respectively. When a finger presses the fingerprint sensor 100, a fingerprint capacitor 207 is formed between a finger surface and the sensing electrode plate, that is, the sensing electrode plate acts as one of electrode plates of the fingerprint capacitor 207, while the finger surface acts as the other electrode plate of the fingerprint capacitor 207, and a cover between the finger and the sensing electrode plate, as well as other material layers (such as a plastic-encapsulation layer of the fingerprint sensor 100) serve as a dielectric layer of the fingerprint capacitor 207. Since a finger surface has different high and low textures, i.e., fingerprint ridges and valleys, a distance between the fingerprint ridge on the finger surface and a sensing electrode plate is different from that between the fingerprint valley on the finger surface and the sensing electrode plate when a finger presses the fingerprint sensor 100, which results in different capacitances of the fingerprint capacitors 207 in different positions. Therefore, whether the respective position corresponds to a fingerprint ridge or a fingerprint valley of a finger surface can be learned by detecting the capacitance of the fingerprint capacitor 207, and the fingerprint sensor 100 could obtain a fingerprint image of the finger surface by detecting each of the fingerprint capacitors 207.

In the circuit shown in FIG. 2, a positive electrode plate of the fingerprint capacitor 207 refers to the corresponding sensing electrode plate, and a negative electrode plate of the fingerprint capacitor 207 refers to a finger surface, which can be equivalent to performing grounding processing through a human body. The fingerprint capacitor 207 is connected to a power supply VDD through the switch 203 and to the input terminal of the amplification circuit through the switch 204. The switch 203 is equivalent to a charge switch of the fingerprint capacitor 207, and may charge the fingerprint capacitor 207 when turned on, so that the fingerprint capacitor 207 generates induced charges on the sensing electrode plate, and a capacitance of the induced charges is correlated with a capacitance of the fingerprint capacitor 207. The switch 204 is equivalent to a discharge switch of the fingerprint capacitor 207; and when the switch 204 is turned off, charges of the fingerprint capacitor 207 may be transferred to the integration capacitor 209, thereby obtaining the input voltage Vn. Therefore, when the switch 203 and the switch 204 are controlled to periodically switch alternately, the fingerprint capacitor 207 can be charged multiple times and the charges generated by each charge can be transferred to the integration capacitor 209 for integration processing; and furthermore, an output voltage Vout is thus obtained at the output terminal of the amplification circuit, the output voltage Vout being related to the fingerprint capacitor 207, which can be used to calculate the capacitance value of the related fingerprint capacitor 207 of the integration circuit.

The base cancelling capacitor 208 may specifically be a parasitic capacitor formed by the sensing electrode plate and another circuit layer inside the fingerprint sensor 100. In the circuit shown in FIG. 2, a positive electrode plate of the base cancelling capacitor 208 and a positive electrode plate of the fingerprint capacitor 207 may share the sensing electrode plate, and a negative electrode plate of the base cancelling capacitor 208 is connected to a power supply voltage VDD and a reference voltage Vdac through the switch 205 and the switch 206, respectively. The fingerprint sensor 100 controls charge and discharge processing of the base cancelling capacitor 208 by means of turnoff and turnon of the switch 205 and the switch 206, thereby implementing base signal cancellation processing of each fingerprint capacitor 207 in the fingerprint sensor 100.

As shown in FIG. 2, the switch 203 and the switch 205 are turned off and turned on under the control of a first switch control signal ck1, while the switch 204 and the switch 206 are turned off and turned on under the control of a second switch control signal ck2. The first switch control signal ck1 and the second switch control signal ck2 are both low level signals when the integration circuit of the fingerprint sensor 100 is in a reset phase, and thus in the reset phase, the switches 203~206 are all in a turnoff state; and the ck1 and the ck2 are bi-phase non-overlapping signals when the integration circuit is in an integration phase, that is, the first switch control signal ck1 and the second switch control signal ck2 are in inverse phase with each other in the integration phase, therefore, the switches 203 and 205 as well as the switches 204 and 206 are alternately switched on with each other in the integration phase.

On the other hand, the reset switch 201 and the feedback switch 202 are turned off and turned on under the control of a first reset control signal rst, the first switch 216 and the third switch 218 are turned off and turned on under the control of a second reset control signal crst, and the second switch 217 is turned off and turned on under the control of a third reset control signal, where the third reset control signal is correlated with the first reset control signal rst and the second reset control signal crst, for example, it may specifically be −crst & rst, as shown in FIG. 2. In other words, the switching state of the second switch 217 may also be considered to be subject to control of the first reset control signal rst and the second reset control signal crst in principle. The fingerprint sensor 100 controls the reset switch 201, the feedback switch 202, the first switch 216, the second switch 217, and the third switch 218 to be turned off and turned on according to a preset timing through the above reset control signals, thereby achieving division of the reset phase of the integration circuit into a first phase and a second phase, where the first phase is an offset voltage acquisition phase and the second phase is an actual reset phase.

Figure 3:
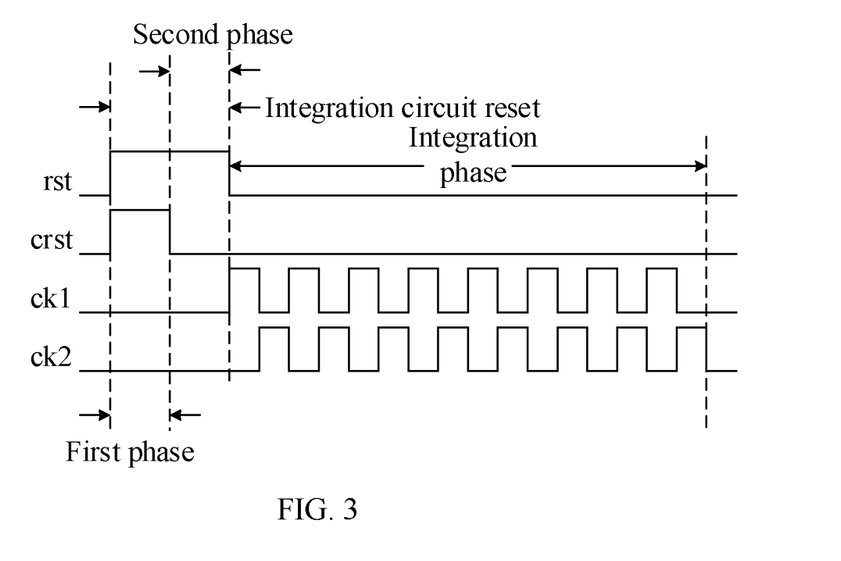
FIG. 3 shows an operating timing diagram of a fingerprint sensor according to an embodiment of the present application.

The operating principle of the circuit shown in FIG. 2 will be described in detail below with reference to a timing diagram of FIG. 3. As shown in FIG. 3, a timing period of the integration circuit may be divided into an integration circuit reset phase and an integration circuit integration phase, and the integration circuit reset phase may be further divided into a first phase (an offset voltage acquisition phase) and a second phase (an actual reset phase).

Figure 4:
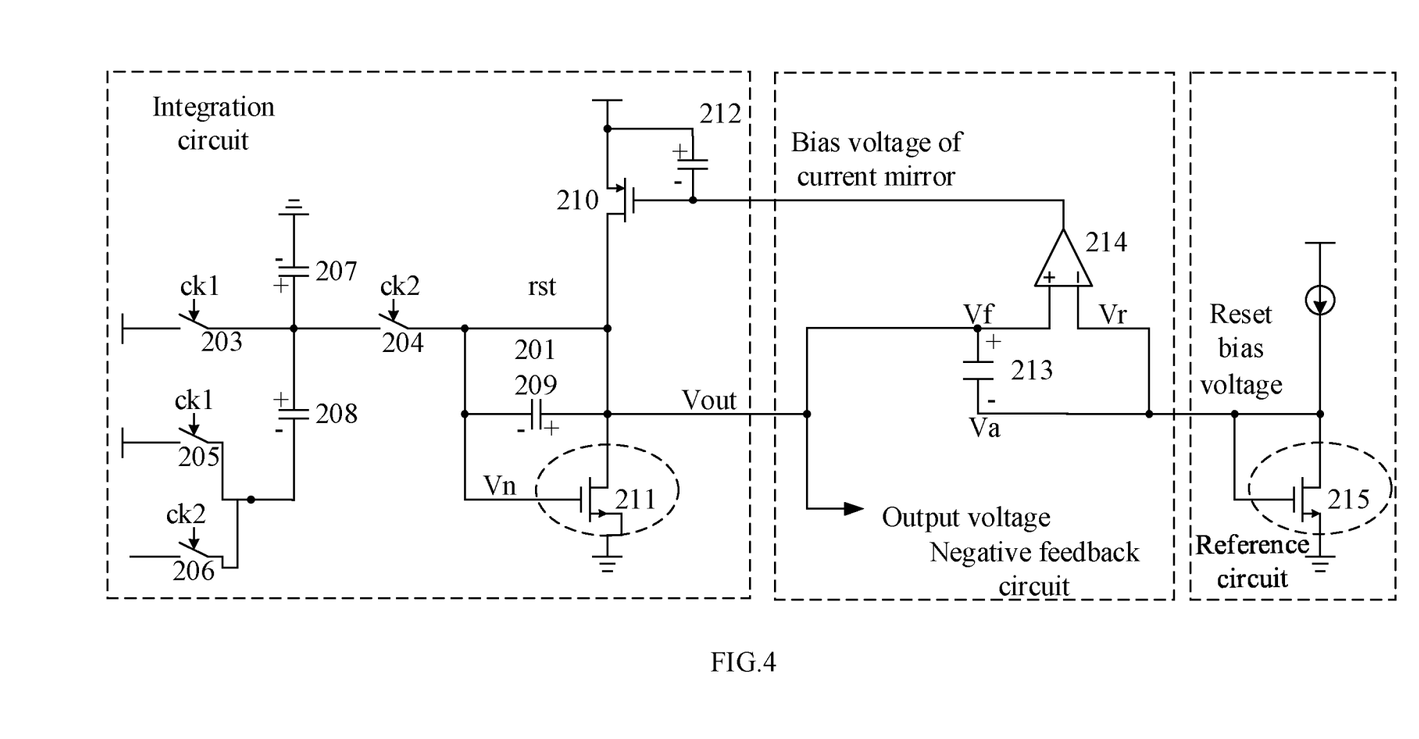
FIG. 4 shows another schematic circuit diagram of a fingerprint sensor according to an embodiment of the present application.

Specifically, in the first phase of the reset phase, rst=1, crst=1, ck1=0, and ck2=0 in FIG. 3, the reset switch 201, the feedback switch 202, the first switch 216 and the third switch 218 in FIG. 2 are turned on, while the second switch 217 is turned off, and the operational amplifier 214 is powered on. The operational amplifier 214 forms a negative feedback loop with the first MOS transistor 211 and the second MOS transistor 210 of the amplification circuit, and the reset bias voltage provided by the reference circuit charges the zeroing capacitor 213 through the third switch 218. An equivalent circuit diagram of the first phase can be as shown in FIG. 4. At the end of the first phase, according to the principle of a virtual short circuit at both terminals of an operational amplifier, a voltage Vf of the non-inverting input terminal of the operational amplifier 214 should be equal to a voltage Vr of the inverting input terminal. Since the inverting input terminal is connected to the negative electrode plate of the zeroing capacitor 213 through the third switch 218, a voltage Va of the negative electrode plate of the zeroing capacitor 213 is equal to the voltage Vr of the inverting input terminal, and an offset voltage Vf-Vr at two terminals of the operational amplifier 214 may be represented by Vf-Va, that is, a voltage across two terminals of the zeroing capacitor 213 is the offset voltage at two terminals of the operational amplifier 214. Therefore, the offset voltage of the operational amplifier 214 can be obtained by the zeroing capacitor 213.

Figure 5:
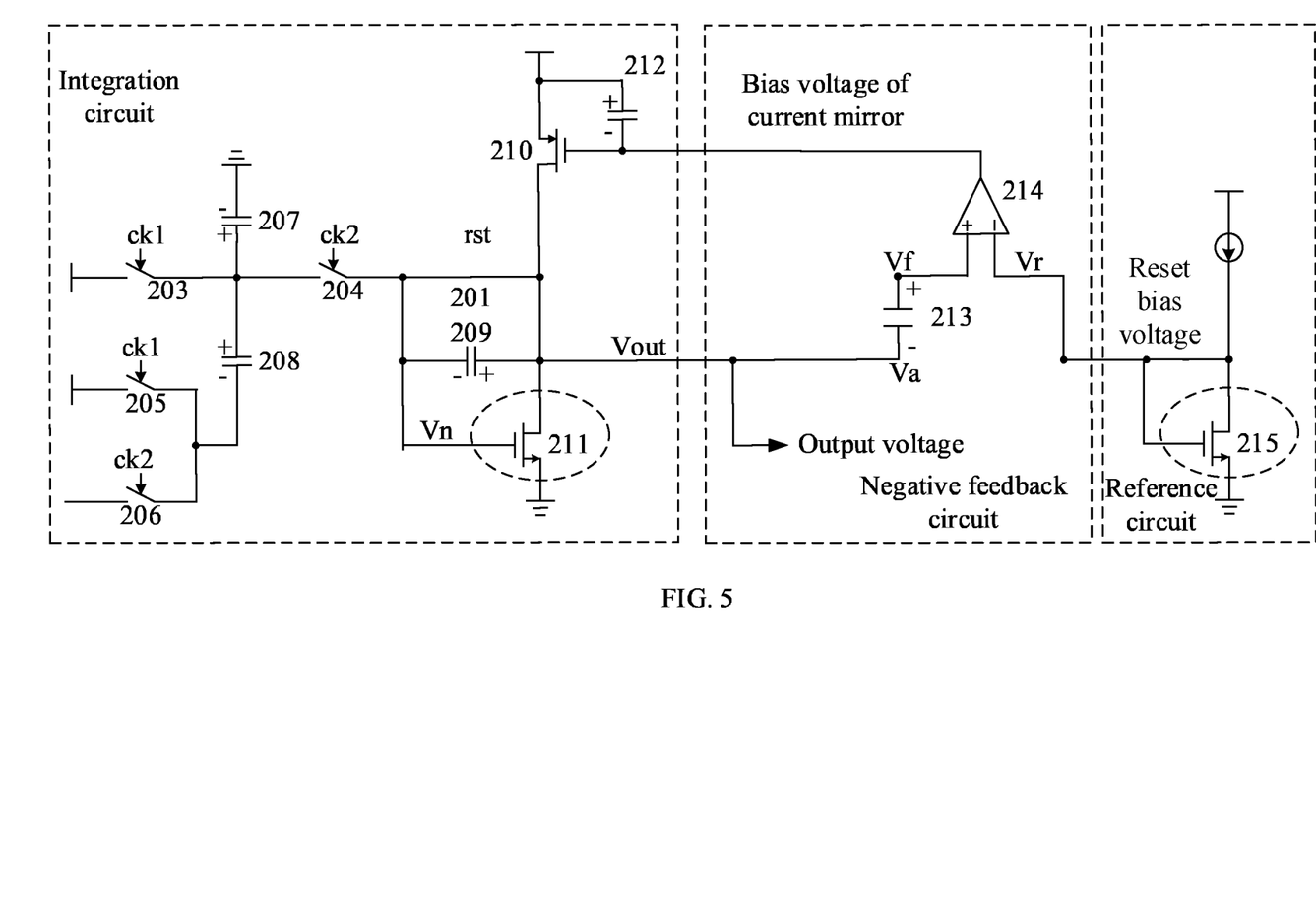
FIG. 5 shows yet another schematic circuit diagram of a fingerprint sensor according to an embodiment of the present application.

In the second phase of the reset phase, rst=1, crst=0, ck1=0, ck2=0 in FIG. 3, the reset switch 201, the feedback switch 202, and the second switch 217 in FIG. 2 are turned on, while the first switch 216 and the third switch 218 are turned off, and thus the operational amplifier 214 and the zeroing capacitor 213 form a negative feedback loop with the first MOS transistor 211 and the second MOS transistor 210 of the amplification circuit. An equivalent circuit diagram of the second phase can be as shown in FIG. 5. As can be obtained from the previous phase, the offset voltage Vf-Vr of the operational amplifier 214 is the voltage across two terminals of the zeroing capacitor 213. Therefore, in the second phase, Va=Vr=Vout=Vn, where Vout denotes an output voltage of the integration circuit, and Vn denotes an input common mode voltage of the integration circuit, that is, an input voltage of the amplification circuit. Therefore, for each integration circuit, it may form a negative feedback loop as shown in FIG. 2 with the negative feedback circuit in its reset phase, thereby fixing the input common mode voltage Vn as a reset bias voltage Vr provided by the reference circuit. Therefore, in the reset phase of the integration circuit, an offset of the first MOS transistor 211 and the second MOS transistor 210 of the amplification circuit can be cancelled.

In the integration phase of the integration circuit, rst=0 and crst=0, the reset switch 201, the feedback switch 202, the first switch 216, the second switch 217, and the third switch 218 are all turned off, and a gate voltage of the second MOS transistor 210 may be maintained by the gate capacitor 212. Therefore, the second MOS transistor 210 may be equivalent to a constant current source, and provides a load for the first MOS transistor 211. Further, in the integration phase of the integration circuit, the first switch control signal ck1 and the second switch control signal ck2 in FIG. 3 are switched on and off alternately. Specifically, when ck1=1 and ck2=0, the switches 203 and 205 are turned on, while the switches 206 and 204 are turned off, and thus the positive electrode plate of the fingerprint capacitor 207 and the negative electrode plate of the base cancelling capacitor 208 are charged to the power supply voltage VDD. When ck1=0 and ck2=1, the switches 203 and 205 are turned off, while the switches 206 and 204 are turned on, and thus the positive electrode plate of the fingerprint capacitor 207 is connected to the input terminal of the amplification circuit. Therefore, the charge of the fingerprint capacitor 207 is transferred to the integration capacitor 209 for one integration processing, thereby forming the input voltage Vn of the amplification circuit (i.e., the input common mode voltage of the integration circuit), while at the same time the negative electrode plate of the base cancelling capacitor 208 is charged to the reference voltage Vdac, and therefore, an output voltage increment of one integration of each integration circuit can be obtained as follows:

$$\Delta V_{out} = -\frac{C_f}{C_i}(VDD - Vr) - \frac{C_c}{C_i}(V_{dac} - Vr)$$

Where Ci denotes a capacitance value of the integration capacitor 209, Cc denotes a capacitance value of the base cancelling capacitor 208, and Cf denotes a capacitance value of the fingerprint capacitor 207; VDD and Vdac respectively denote the power supply voltage and the reference voltage received by the integration circuit, Vr denotes a reset bias voltage provided by the reference circuit. Since the values of Ci, Cc, VDD, Vdac, and Vr are all known, and for the M*N integration circuit array, Ci, Cc, VDD, Vdac, and Vr of each integration circuit are all the same, the output voltage increment ΔVout is only related to the capacitance value Cf of the fingerprint capacitor. As long as the output voltage increment ΔVout is measured, the capacitance value Cf of the fingerprint capacitor can be calculated, and data of a fingerprint image is further acquired.

Further, the output voltage Vout of the fingerprint sensor 100 may be input to a processing unit that measures the voltage value of the output voltage Vout and calculates the capacitance value Cf of the corresponding fingerprint capacitor.

FIG. 4 and FIG. 5 show equivalent circuit diagrams of an integration circuit in an M*N integration circuit array in a first phase and a second phase of an integration reset phase respectively according to embodiments of the present application. Specifically, as shown in FIG. 4, in the first phase of the integration reset phase, the reset switch 201 of the integration circuit is turned on under the control of the first reset control signal rst, and thus the integration capacitor 209 is short-circuited by the reset switch 201. The first switch control signal ck1 and the second switch control signal ck2 are both at a low level, so that the switches 203-206 are all turned off, and the fingerprint capacitor 207 and the base cancelling capacitor 208 do not operate. The operational amplifier 214 forms a negative feedback loop with the first MOS transistor 211 and the second MOS transistor 210 of the amplification circuit. According to the foregoing description, the offset voltage Vf-Vr of the operational amplifier 214 is the voltage across two terminals of the zeroing capacitor 213, i.e., Vf−Vr=Vf−Va.

As shown in FIG. 5, in the second phase of the integration reset phase, the reset switch 201 of the integration circuit is maintained in a turnon state under the control of the first reset control signal rst, and thus the integration capacitor 209 is still short-circuited; and the switches 203-206 are maintained in a turnoff state under the control of the first switch control signal ck1 and the second switch control signal ck2, and thus the fingerprint capacitor 207 and the base cancelling capacitor 208 still do not operate. The operational amplifier 214 and the zeroing capacitor 213 form a negative feedback loop with the first MOS transistor 211 and the second MOS transistor 210 of the amplification circuit, and the gate capacitor 212 is used for maintaining the gate voltage of the second MOS transistor 210 in the integration phase. An output terminal of the integration circuit is directly connected to a negative electrode plate of the zeroing capacitor 213, and since the reset switch 201 is turned on, an output voltage Vout of the integration circuit is equal to a common mode input voltage Vn of the amplification circuit. As can be seen from the first phase, the voltage Va of the negative electrode plate of the zeroing capacitor 213 is equal to the voltage Vr of the inverting input terminal of the operational amplifier 214, and therefore, Va=Vf=Vout=Vn. And since the voltage at the inverting input terminal of the operational amplifier 214 is a reset bias voltage Vr provided by the reference circuit, which is a fixed value, the common mode input voltage Vn of the amplification circuit is fixed as the reset bias voltage Vr. For each integration circuit of the fingerprint sensor 100, the each integration circuit forms a negative feedback loop with the negative feedback circuit when in the reset phase, so that for an integration circuit array, an input common mode voltage Vn of each integration circuit can be fixed as a reset bias voltage in an integration reset phase by introducing a negative feedback circuit, thereby facilitating cancellation of an offset voltage of the integration circuit array.

It should be understood that in FIGS. 2, 4 and 5, a reference circuit provides a reset bias voltage for a negative feedback circuit. Therefore, an adjustable resistor may be configured in a reference circuit so as to obtain a desirable reset bias voltage by adjusting a value of the adjustable resistor without changing the circuit. Alternatively, the negative feedback circuit may also be directly connected to a fixed voltage to achieve cancellation of an offset voltage of an operational amplifier.

Figure 6:
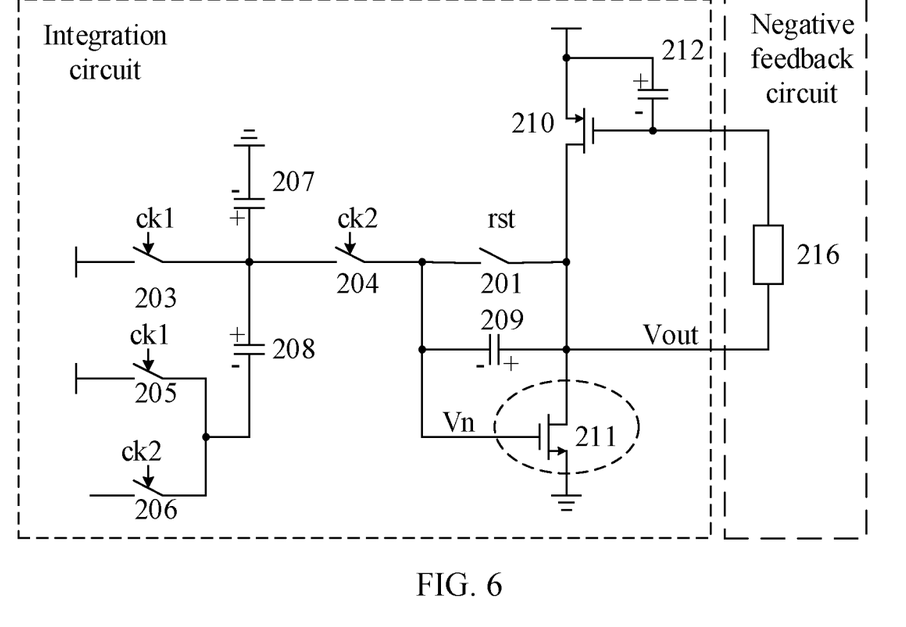
FIG. 6 shows yet another schematic circuit diagram of a fingerprint sensor according to an embodiment of the present application.

Optionally, in an embodiment of the preset application, another negative feedback circuit may also be used to stabilize an input common mode voltage Vn of each integration circuit to a fixed value. As shown in FIG. 6, the negative feedback circuit may include a resistor 216; the integration circuit may be the same as that in FIG. 2, and mainly includes an amplification circuit, an integration capacitor 209, and a reset switch 201, and the amplification circuit includes a first MOS transistor 211 and a second MOS transistor 210. The integration circuit further includes a fingerprint capacitor 207, a base cancelling capacitor 208, an integration capacitor 209, and switches 203-206. When the integration circuit is in a reset phase, that is, a reset switch 201 in FIG. 6 is turned on, and an output voltage Vout of the integration circuit is equal to an input common mode voltage Vn of the amplification circuit, and therefore, the output voltage Vout of the integration circuit may be stabilized by the feedback resistor 216, that is, the input common mode voltage Vn of the amplification circuit is stabilized. If the value of the feedback resistor connected to each of the integration circuits is the same, it is also possible to fix the input common mode voltage Vn of each of the integration circuits in an integration circuit array to the same value. It should be understood that similar to the operating principle of FIG. 2, the negative feedback circuit operates only in an integration reset phase, and may be disconnected from the integration circuit when in an integration phase.

Generally, due to a defect of an operational amplifier itself, that is, there is a voltage difference between two input terminals of the operational amplifier, or referred to as an offset voltage, accuracy may not be sufficiently high when using the operational amplifier to achieve a negative feedback, and therefore in this embodiment, a special circuit design is adopted to cancel the offset voltage at two terminals of the operational amplifier. For example, as shown in FIGS. 2, 3 and 5, the zeroing capacitor 213 may be used to acquire the offset voltage at two terminals of the operational amplifier 214, that is, an offset correction unit in the embodiment of the present application may include a zeroing capacitor, but the embodiment of the present application is not limited thereto. It should be also understood that the circuit structure of the fingerprint sensor provided in any of the foregoing embodiments of the present application is merely for illustrative description, and the embodiments of the present application include but are not limited thereto.

Therefore, according to a fingerprint sensor of an embodiment of the present application, offset voltages of N*M integration circuits may be reduced or even cancelled by introducing a negative feedback circuit in an integration reset phase, and further, an SNR of a fingerprint image could be improved without occupying main control RAM resources. That is, it is not necessary to overcome an offset of a self-capacitive fingerprint sensor by acquiring images of two frames and performing subtraction between the images of the two frames. Moreover, since the negative feedback circuit only operates in a reset phase of an integration circuit, power consumption is substantially not increased.

An embodiment of the present application further provides a terminal device, and the terminal device includes a display screen, a back cover, and a fingerprint sensor provided by any of embodiments of the present application. The display screen may be a touch display screen located on a front face of the terminal device, and the back cover is located on a back face of the terminal device. The fingerprint sensor may be disposed on the front face or the back face of the terminal device. For example, the display screen includes a protective cover (i.e., a main glass cover), and the protective cover is provided with a through hole at a position adjacent to a display area, or the back cover may be provided with a through hole in a predetermined area. The fingerprint sensor may be disposed on the through hole provided by the protective cover or the back cover, and a surface of the fingerprint sensor may be configured with a fingerprint pressing cover (such as a glass cover, a ceramic cover, a sapphire cover, etc.) or provided with a coating layer. Alternatively, the fingerprint sensor may be hidden under the protective cover or the back cover (no need to provide a through hole), and the protective cover or the back cover is thinned in an area where the fingerprint sensor is located in order to make the thickness of the protective cover in the area smaller than that of the protective cover in other areas; and if the fingerprint sensor is hidden under the back cover, preferably, the back cover is made of a non-metallic material, such as a ceramic back cover or a glass back cover, so as to avoid shielding or interference on a fingerprint sensing signal. In other alternative embodiments, the fingerprint sensor is disposed directly under the display screen to form an under-screen fingerprint structure.

Therefore, according to a terminal device provided in an embodiment of the present application, an offset voltage of N*M integration circuits may be reduced or even cancelled by introducing a negative feedback circuit in an integration reset phase of a fingerprint sensor, and further, an SNR of a fingerprint image could be improved without occupying main control RAM resources.

Those of ordinary skill in the art may be aware that, units and circuits of the examples described in the embodiments disclosed in this paper may be implemented by electronic hardware or a combination of computer software and the electronic hardware. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the present application.

In several embodiments provided by the present application, it should be understood that the disclosed circuits, branches, and units may be implemented by other manners. For example, the embodiments of the forgoing branches are exemplary, for example, the division of the units is only a logic function division, other division modes may be adopted in practice, e.g., multiple units or components may be combined or integrated in a branch, or some characteristics may be omitted or be not executed.

If being implemented in the form of a software functional unit and sold or used as a separate product, the integrated unit may be stored in a computer-readable storage medium. Based on such understanding, the nature of the technical solutions of the present application, or the part contributing to the prior art, or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (Read-Only Memory, ROM), a random access memory (Random Access Memory, RAM), a magnetic disk, a compact disk, and so on.

Described above are the specific embodiments of the present application only, but the protection scope of the present application is not limited to this, those skilled who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A fingerprint sensor, the fingerprint sensor comprising a plurality of integration circuits and a negative feedback circuit;
    wherein the negative feedback circuit is connected to the plurality of integration circuits for respectively fixing an input common mode voltage of each of the integration circuits as a reset bias voltage when the plurality of integration circuits are in a reset phase; and
    each of the integration circuits comprises an input terminal, a feedback terminal, and an output terminal, and each of the integration circuits comprises an integration capacitor and corresponds to a fingerprint capacitor respectively, wherein the integration capacitor is connected between the input terminal and the output terminal, and the feedback terminal and the output terminal are connected to the negative feedback circuit to form a negative feedback loop, and each of the integration circuits is configured to perform integration processing by transferring a charge of the corresponding fingerprint capacitor to the integration capacitor when in an integration phase respectively, and output an output voltage related to the corresponding fingerprint capacitor;
    wherein the negative feedback circuit comprises an operational amplifier, and the operational amplifier is configured to form a negative feedback loop with the integration circuit when the integration circuit is in the reset phase;
    wherein the negative feedback circuit comprises an offset correction circuit, and the reset phase of the integration circuit includes a first phase and a second phase, wherein the offset correction circuit is configured to acquire an offset voltage at two input terminals of the operational amplifier when the integration circuit is in the first phase, and the offset voltage is used to perform offset correction on the integration circuit in the second phase, so that the input common mode voltage of the integration circuit is fixed as the reset bias voltage, wherein the offset correction circuit comprises a zeroing capacitor;
    wherein one terminal of the zeroing capacitor is connected to a non-inverting input terminal of the operational amplifier, and also connected to an output terminal of the integration circuit when the integration circuit is in the first phase, while disconnected from the output terminal of the integration circuit when the integration circuit is in the second phase; and the other terminal of the zeroing capacitor is connected to an inverting input terminal of the operational amplifier when the integration circuit is in the first phase, while connected to the output terminal of the integration circuit, and disconnected from the inverting input terminal of the operational amplifier when the integration circuit is in the second phase.

2. The fingerprint sensor according to claim 1, wherein the fingerprint sensor further comprises a reference circuit, and the reference circuit is connected to the operational amplifier for providing the reset bias voltage to the operational amplifier.

3. The fingerprint sensor according to claim 1, wherein the negative feedback circuit further comprises a first switch, a second switch and a third switch; one terminal of the zeroing capacitor is connected to a non-inverting input terminal of the operational amplifier, and connected to an output terminal of the integration circuit through the first switch; and the other terminal of the zeroing capacitor is connected to the output terminal of the integration circuit through the second switch, and connected to an inverting input terminal of the operational amplifier through the third switch, and an output terminal of the operational amplifier is connected to a feedback terminal of the integration circuit.

4. The fingerprint sensor according to claim 3, wherein when the integration circuit is in the first phase, the first switch and the third switch are turned on, while the second switch is turned off; and when the integration circuit is in the second phase, the first switch and the third switch are turned off, while the second switch is turned on.

5. The fingerprint sensor according to claim 1, wherein the integration circuit comprises an amplification circuit, and the amplification circuit comprises an input terminal for receiving the input common mode voltage, a feedback terminal connected to the negative feedback circuit, and an output terminal for providing the output voltage.

6. The fingerprint sensor according to claim 5, wherein the amplification circuit comprises a first MOS transistor and a second MOS transistor, wherein the second MOS transistor is connected to the negative feedback circuit for providing a constant current to the first MOS transistor when the integration circuit is in an integration phase.

7. The fingerprint sensor according to claim 6, wherein a gate of the first MOS transistor is connected to the input terminal of the amplification circuit, a source of the first MOS transistor is grounded, and a drain of the first MOS transistor is connected to the output terminal of the amplification circuit; and a gate of the second MOS transistor is connected to the feedback terminal of the amplification circuit through a feedback switch, a drain of the second MOS transistor is connected to the drain of the first MOS transistor, and a source of the second MOS transistor is connected to a power supply terminal, and a gate capacitor is provided between the gate and the source of the second MOS transistor.

8. The fingerprint sensor according to claim 7, wherein the feedback switch is turned off when the integration circuit is in the integration phase, and is turned on when the integration circuit is in the reset phase.

9. The fingerprint sensor according to claim 8, wherein the integration circuit further comprises a reset switch, and the reset switch and the integration capacitor are connected in parallel with each other and connected between the gate and the drain of the first MOS transistor.

10. The fingerprint sensor according to claim 1, wherein the plurality of integration circuits comprise a plurality of rows of integration circuits, and the negative feedback circuit corresponds to one row of integration circuits.

11. A terminal device, wherein the terminal device comprises a fingerprint sensor; the fingerprint sensor comprises a plurality of integration circuits and a negative feedback circuit;
wherein the negative feedback circuit is connected to the plurality of integration circuits for respectively fixing an input common mode voltage of each of the integration circuits as a reset bias voltage when the plurality of integration circuits are in a reset phase; and
each of the integration circuits comprises an input terminal, a feedback terminal, and an output terminal, and each of the integration circuits comprises an integration capacitor and corresponds to a fingerprint capacitor respectively, wherein the integration capacitor is connected between the input terminal and the output terminal, and the feedback terminal and the output terminal are connected to the negative feedback circuit to form a negative feedback loop, and each of the integration circuits is configured to perform integration processing by transferring a charge of the corresponding fingerprint capacitor to the integration capacitor when in an integration phase respectively, and output an output voltage related to the corresponding fingerprint capacitor;
wherein the negative feedback circuit comprises an operational amplifier, and the operational amplifier is configured to form a negative feedback loop with the integration circuit when the integration circuit is in the reset phase;
wherein the negative feedback circuit comprises an offset correction circuit, and the reset phase of the integration circuit includes a first phase and a second phase, wherein the offset correction circuit is configured to acquire an offset voltage at two input terminals of the operational amplifier when the integration circuit is in the first phase, and the offset voltage is used to perform offset correction on the integration circuit in the second phase, so that the input common mode voltage of the integration circuit is fixed as the reset bias voltage, wherein the offset correction circuit comprises a zeroing capacitor;
wherein one terminal of the zeroing capacitor is connected to a non-inverting input terminal of the operational amplifier, and also connected to an output terminal of the integration circuit when the integration circuit is in the first phase, while disconnected from the output terminal of the integration circuit when the integration circuit is in the second phase; and the other terminal of the zeroing capacitor is connected to an inverting input terminal of the operational amplifier when the integration circuit is in the first phase, while connected to the output terminal of the integration circuit, and disconnected from the inverting input terminal of the operational amplifier when the integration circuit is in the second phase.

* * * * *